United States Patent
Lin et al.

(10) Patent No.: US 12,073,038 B2
(45) Date of Patent: Aug. 27, 2024

(54) TOUCH DISPLAY DEVICE

(71) Applicant: E Ink Holdings Inc., Hsinchu (TW)

(72) Inventors: Chen Cheng Lin, Hsinchu (TW);
Mondal Somnath, Hsinchu (TW);
Fang Chia Hu, Hsinchu (TW); Hung Wei Tseng, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 18/182,402

(22) Filed: Mar. 13, 2023

(65) Prior Publication Data
US 2023/0350509 A1    Nov. 2, 2023

(30) Foreign Application Priority Data

Apr. 27, 2022   (TW) .................................. 111115984

(51) Int. Cl.
*G06F 3/041*     (2006.01)
*B32B 7/12*      (2006.01)
*G06F 3/044*     (2006.01)

(52) U.S. Cl.
CPC .............. *G06F 3/0412* (2013.01); *B32B 7/12* (2013.01); *G06F 3/0445* (2019.05)

(58) Field of Classification Search
CPC ...... G06F 3/041–047; G06F 2203/041–04114; G06F 3/0445; H10K 59/00–95; H10K 59/40; B32B 7/12; B32B 2457/208; B32B 2307/42; B32B 27/281; B32B 2307/51; B32B 2307/732; G02F 1/167; G02F 1/133331; G02F 1/13338; G09G 3/344
See application file for complete search history.

(56) References Cited

U.S. PATENT DOCUMENTS

| | | | |
|---|---|---|---|
| 8,836,692 B2 | 9/2014 | Kim et al. |
| 9,257,082 B2 | 2/2016 | Kimura et al. |
| 9,513,754 B2 | 12/2016 | Katsuta |
| 9,665,221 B2 | 5/2017 | Han et al. |
| 9,715,308 B2 | 7/2017 | Katsuta et al. |
| 9,766,765 B2 | 9/2017 | Katsuta |

(Continued)

FOREIGN PATENT DOCUMENTS

| | | |
|---|---|---|
| TW | 201017495 | 5/2010 |
| TW | 201818206 | 5/2018 |
| TW | I747672 | 11/2021 |

OTHER PUBLICATIONS

"Office Action of Taiwan Counterpart Application", issued on Apr. 17, 2023, p. 1-p. 4.

*Primary Examiner* — Sanjiv D. Patel
(74) *Attorney, Agent, or Firm* — JCIPRNET (57) ABSTRACT

A touch display device includes a driving substrate, a display medium layer, a common electrode layer, a touch electrode layer, and a protective layer. The display medium layer is disposed on the driving substrate. The common electrode layer is in direct contact with and disposed on the display medium layer. The common electrode layer includes multiple common electrodes, and two adjacent of the common electrodes have a spacing between each other. The touch electrode layer is disposed on the display medium layer. The touch electrode layer and the common electrode layer define a touch structure layer. The protective layer is disposed on the touch electrode layer.

11 Claims, 6 Drawing Sheets

(56) References Cited

U.S. PATENT DOCUMENTS

| | | |
|---|---|---|
| 9,864,457 B2 | 1/2018 | Tada et al. |
| 9,916,036 B2 | 3/2018 | Katsuta et al. |
| 9,952,700 B2 | 4/2018 | Kurasawa et al. |
| 10,120,521 B2 | 11/2018 | Katsuta |
| 10,139,942 B2 | 11/2018 | Kurasawa et al. |
| 10,241,597 B2 | 3/2019 | Jung et al. |
| 10,263,119 B2 | 4/2019 | Nakagawa et al. |
| 10,277,181 B2 | 4/2019 | Inoue |
| 10,310,678 B2 | 6/2019 | Ishizaki et al. |
| 10,545,612 B2 | 1/2020 | Takahashi |
| 10,686,080 B2 | 6/2020 | Nakagawa et al. |
| 10,698,512 B2 | 6/2020 | Ishizaki et al. |
| 10,712,847 B2 | 7/2020 | Kim et al. |
| 10,768,761 B2 | 9/2020 | Ishizaki et al. |
| 10,775,913 B2 | 9/2020 | Yu et al. |
| 2010/0085324 A1* | 4/2010 | Noguchi ............... G06F 3/044 345/174 |
| 2012/0062503 A1 | 3/2012 | Zhuang et al. |
| 2014/0063022 A1 | 3/2014 | Chan et al. |
| 2018/0301660 A1* | 10/2018 | Liu ..................... B32B 17/06 |
| 2019/0088183 A1 | 3/2019 | Jeong et al. |
| 2020/0033989 A1 | 1/2020 | Park et al. |
| 2020/0348785 A1* | 11/2020 | Tang ..................... H10K 59/40 |
| 2022/0083172 A1 | 3/2022 | Kim et al. |

\* cited by examiner

TOUCH DISPLAY DEVICE

CROSS-REFERENCE TO RELATED APPLICATION

This application claims the priority benefit of Taiwan application serial no. 111115984, filed on Apr. 27, 2022. The entirety of the above-mentioned patent application is hereby incorporated by reference herein and made a part of this specification.

BACKGROUND

Technical Field

The disclosure relates to a display device, and in particular to a touch display device.

Description of Related Art

In the current technology, a touch display device is composed of a driving substrate, a display module disposed on the driving substrate, and an external touch substrate adhered to the display module by an optical adhesive layer. However, mounting the touch substrate on the display module will make it impossible to reduce the thickness of the touch display device and meet the demand for thinness. In addition, the external touch substrate will also reduce the display contrast of the touch display device, which will affect the optical performance of the touch display device.

SUMMARY

The disclosure provides a touch display device, capable of meeting the demand for thinness and effectively reducing manufacturing costs, and may effectively improve optical performance.

The touch display device of the disclosure includes a driving substrate, a display medium layer, a common electrode layer, a touch electrode layer, and a protective layer. The display medium layer is disposed on the driving substrate. The common electrode layer is in direct contact with the display medium layer. The common electrode layer includes multiple common electrodes, and two adjacent of the common electrodes have a spacing between each other. The touch electrode layer is disposed on the display medium layer. The touch electrode layer and the common electrode layer define a touch structure layer. The protective layer is disposed on the touch electrode layer.

In one embodiment of the disclosure, the touch display device further includes a barrier layer, a first substrate, an optical adhesive layer, and a second substrate. The barrier layer is disposed on the common electrode layer. The first substrate is disposed on the barrier layer. The optical adhesive layer is disposed on the first substrate. The second substrate is disposed on the optical adhesive layer. The touch electrode layer is located between the second substrate and the optical adhesive layer. The common electrode layer, the barrier layer, the first substrate, the optical adhesive layer, the touch electrode layer, and the second substrate define the touch structure layer.

In one embodiment of the disclosure, the touch display device further includes a first ultra-thin glass (UTG), an optical adhesive layer, and a second ultra-thin glass. The first ultra-thin glass is disposed on the common electrode layer. The optical adhesive layer is disposed on the first ultra-thin glass. The second ultra-thin glass is disposed on the optical adhesive layer. The touch electrode layer is located between the second ultra-thin glass and the optical adhesive layer. The common electrode layer, the first ultra-thin glass, the optical adhesive layer, the touch electrode layer, and the second ultra-thin glass define the touch structure layer.

In one embodiment of the disclosure, a thickness of the first ultra-thin glass and a thickness of the second ultra-thin glass are both less than 150 μm. Water permeability of the first ultra-thin glass and water permeability of the second ultra-thin glass are less than $10^{-6}$ g/m².

In one embodiment of the disclosure, the touch display device further includes an ultra-thin glass disposed on the common electrode layer. The ultra-thin glass is located between the common electrode layer and the touch electrode layer. The common electrode layer, the ultra-thin glass, and the touch electrode layer define the touch structure layer.

In one embodiment of the disclosure, the touch display device further includes an ultra-thin glass disposed on the common electrode layer and the touch electrode layer. Multiple touch electrodes of the touch electrode layer and the common electrodes of the common electrode layer are alternately arranged and belong to the same film layer. The common electrode layer, the touch electrode layer, and the ultra-thin glass define the touch structure layer.

In one embodiment of the disclosure, the touch display device further includes an insulating layer and an ultra-thin glass. The insulating layer is disposed on the common electrode layer. The ultra-thin glass is disposed on the touch electrode layer, and the touch electrode layer is located between the ultra-thin glass and the insulating layer. The common electrode layer, the insulating layer, the touch electrode layer, and the ultra-thin glass define the touch structure layer.

In one embodiment of the disclosure, a thickness of the ultra-thin glass is less than 150 μm. Water permeability of the ultra-thin glass is less than $10^{-6}$ g/m².

In one embodiment of the disclosure, the touch display device further includes a first optical adhesive layer, a light guide plate, and a second optical adhesive layer. The first optical adhesive layer is disposed on the touch structure layer. The light guide plate is disposed on the first optical adhesive layer. The second optical adhesive layer is disposed on the light guide plate, and the protective layer is disposed on the second optical adhesive layer.

In one embodiment of the disclosure, the spacing is less than or equal to 50 μm.

Based on the above, in the design of the touch display device of the disclosure, the common electrode layer is in direct contact with and disposed on the display medium layer, and the touch electrode layer and the common electrode layer define the touch structure layer, which means that the common electrode layer may be used as both the common electrode and the touch electrode. In this way, the process steps of the touch display device of the disclosure may be effectively reduced to reduce the manufacturing cost, and the overall thickness of the touch display device of the disclosure may be effectively reduced to enhance the optical properties and meet the demand of thinness.

To make the aforementioned more comprehensible, several accompanied with drawings are described in detail as follows.

BRIEF DESCRIPTION OF THE DRAWING

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

The embodiments of the disclosure may be understood together with the drawings, and the drawings of the disclosure are also considered as part of the disclosure. It should be understood that the drawings of the disclosure are not drawn to scale and, in fact, the size of the elements may be arbitrarily enlarged or reduced in order to clearly represent the features of the disclosure. In addition, when it is mentioned that the first layer is on or above the second layer, it may include the situation where the first layer is in direct contact with the second layer or the first layer and the second layer may not be in direct contact with the second layer, i.e., the first layer may be separated from the second layer by one or more other structure layers. However, if the first layer is directly on the second layer, it means that the first layer is in direct contact with the second layer.

Figure 1A:
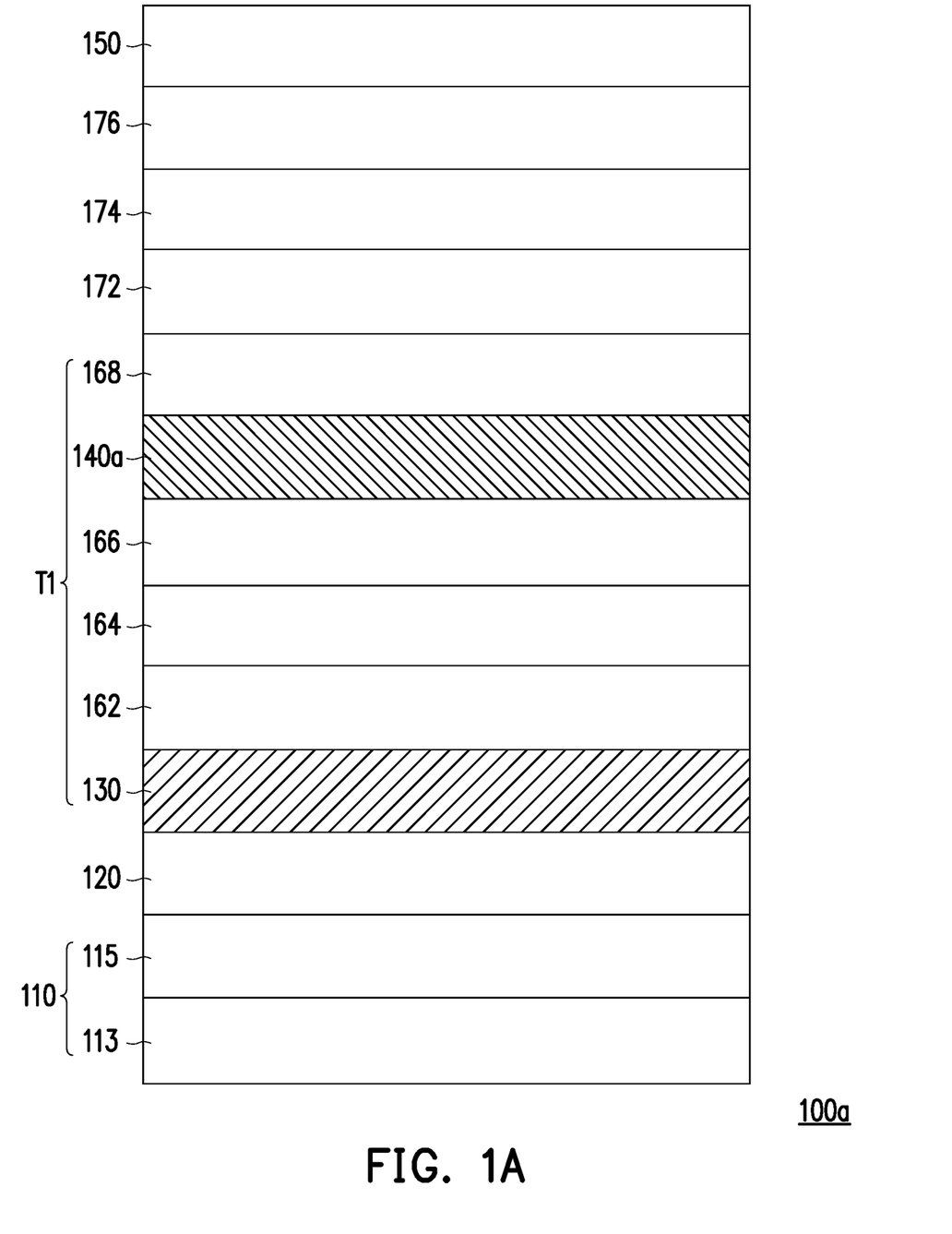
FIG. 1A is a schematic view of a touch display device according to an embodiment of the disclosure.
Figure 1B:
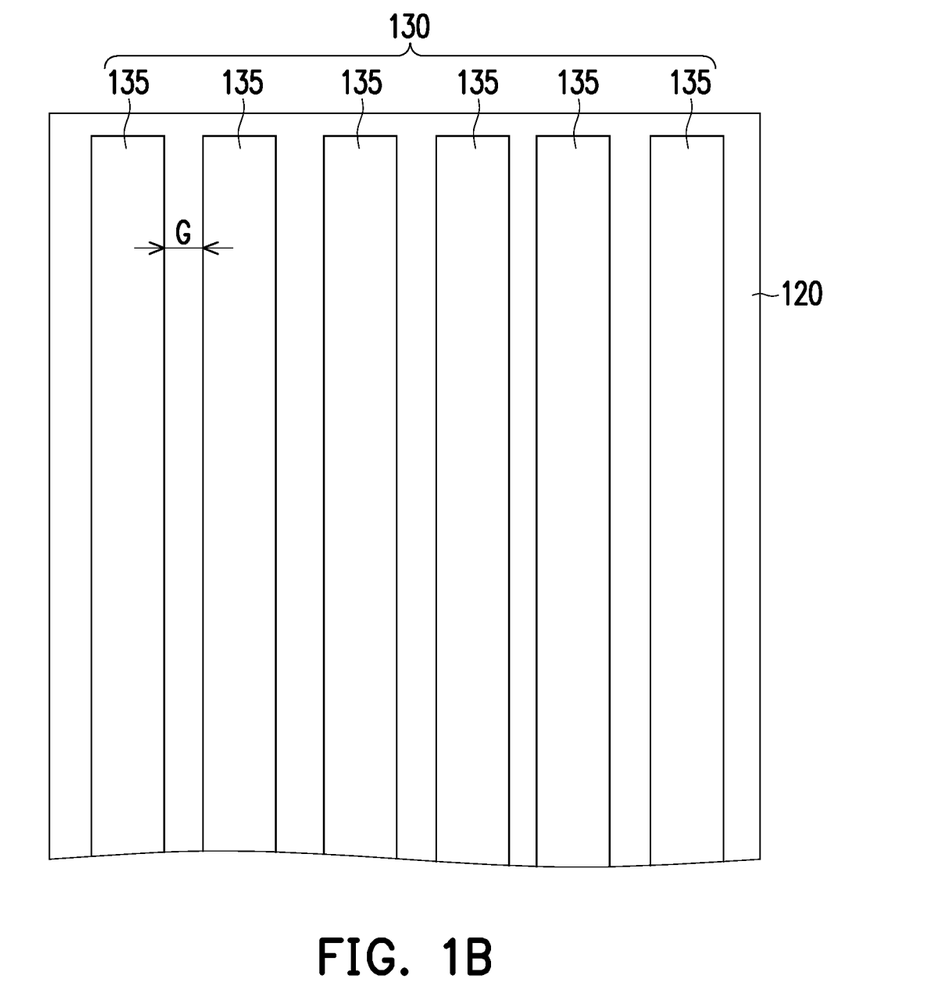
FIG. 1B is a schematic top view of a common electrode layer of the touch display device of FIG. 1A.

FIG. 1A is a schematic view of a touch display device according to an embodiment of the disclosure. FIG. 1B is a schematic top view of a common electrode layer of the touch display device of FIG. 1A. Referring first to FIG. 1A, in this embodiment, a touch display device 100a includes a driving substrate 110, a display medium layer 120, a common electrode layer 130, a touch electrode layer 140a, and a protective layer 150. The display medium layer 120 is disposed on the driving substrate 110. The common electrode layer 130 is in direct contact with and disposed on the display medium layer 120, i.e., the common electrode layer 130 is in direct contact with the display medium layer 120. The touch electrode layer 140a is disposed on the display medium layer 120. The touch electrode layer 140a and the common electrode layer 130 define a touch structure layer T1. A protective layer 150 is disposed on the touch electrode layer 140a.

In detail, the driving substrate 110 according to this embodiment includes a backplane 113 and an active element layer 115. The active element layer 115 is disposed on the backplane 113. That is, the driving substrate 110 according to this embodiment is specified as an active element array substrate, which may be, for example, a thin film transistor (TFT) array substrate or a thin film diode (TFD) array substrate, but not limited thereto. Here, the backplane 113 is, for example, a flexible substrate, and a material thereof is, for example, plastic, or is, for example, a glass substrate, but not limited thereto. The display medium layer 120 is, for example, an electrophoretic display film or an electro-wetting display film, but not limited thereto. Here, the driving substrate 110, the display medium layer 120, and the common electrode layer 130 may define a display structure layer.

Furthermore, referring to FIG. 1A again, the touch display device 100a according to this embodiment further includes a barrier layer 162, a first substrate 164, an optical adhesive layer 166, and a second substrate 168. The barrier layer 162 is disposed on the common electrode layer 130, the first substrate 164 is disposed on the barrier layer 162, and the optical adhesive layer 166 is disposed on the first substrate 164. The second substrate 168 is disposed on the optical adhesive layer 166, and the touch electrode layer 140a is located between the second substrate 168 and the optical adhesive layer 166. That is, the barrier layer 162, the first substrate 164, the optical adhesive layer 166, the touch electrode layer 140a, and the second substrate 168 are sequentially stacked and disposed on the common electrode layer 130. Here, the common electrode layer 130, the barrier layer 162, the first substrate 164, the optical adhesive layer 166, the touch electrode layer 140a, and the second substrate 168 may define the touch structure layer T1. The common electrode layer 130 may be regarded as a driving electrode of the touch structure layer T1, and the touch electrode layer 140a may be regarded as a receiving electrode of the touch structure layer T1.

That is, according to this embodiment, the touch display device 100a integrates the display structure layer with the touch structure layer T1. The common electrode layer 130 may be used as both the common electrode of the display structure layer and the drive electrode of the touch structure layer T1. In this way, the process steps of the touch display device 100a according to this embodiment may be effectively reduced to reduce the manufacturing cost, and the overall thickness of the touch display device 100a according to this embodiment may be effectively reduced to enhance the optical properties and meet the demand of thinness.

Here, a material of the common electrode layer 130 and a material of the touch electrode layer 140a may be, for example, a metal oxide, such as indium tin oxide (ITO) or indium zinc oxide (IZO), respectively; or, a metal, such as a metal mesh, a nano-silver wire, a nano-copper wire; or a nano-carbon tube, graphene, or a combination thereof. A material of the first substrate 164 and a material of the second substrate 168 may be, for example, a plastic material, such as polyethylene terephthalate (PET), colorless polyimide (CPI), or cyclo-olefin polymer (COP), but not limited thereto.

Furthermore, refer to FIG. 1B, the common electrode layer 130 according to this embodiment includes multiple common electrodes 135. Two adjacent of the common electrodes 135 have a spacing G between each other, and a width limit of the spacing G decreases as resolution of the touch display device 100a increases. For a design with the resolution of 300 dpi, the width limit of the spacing G is preferably, for example, less than 50 μm. If higher resolution is required, the spacing G should be adjusted according to the design, i.e., the higher the resolution of the touch display device 100a, the smaller the width limit of the spacing G will be, and correspondingly, the lower the resolution of the touch display device 100a, the larger the width limit of the spacing G will be. That is, the spacing G between the common electrodes 135 may be adjusted according to the desired resolution of the touch display device 100a.

In addition, referring to FIG. 1A again, the touch display device 100a according to this embodiment further includes a first optical adhesive layer 172, a light guide plate 174, and a second optical adhesive layer 176. The first optical adhesive layer 172 is disposed on the touch structure layer T1, and the light guide plate 174 is disposed on the first optical adhesive layer 172. The second optical adhesive layer 176 is disposed on the light guide plate 174, in which the protective layer 150 is disposed on the second optical adhesive layer 176. That is, the first optical adhesive layer 172, the light guide plate 174, and the second optical adhesive layer 176 are located between the protective layer 150 and the touch structure layer T1, and the first optical adhesive layer 172, the light guide plate 174, and the second optical adhesive layer 176 are sequentially stacked on the touch structure layer T1.

In short, the common electrode layer 130 according to this embodiment is directly disposed on the display medium layer 120, and the touch structure layer T1 is defined by the touch electrode layer 140a and the common electrode layer 130. That is, the common electrode layer 130 may be used as both the common electrode of the display structure layer and the drive electrode of the touch structure layer T1, and the driving electrode of the touch structure layer T1 is in direct contact with the display medium layer 120a. In this way, the process steps of the touch display device 100a according to this embodiment may be effectively reduced to reduce the manufacturing cost, and the overall thickness of the touch display device 100a according to this embodiment may be effectively reduced to enhance the optical properties and meet the demand of thinness. Furthermore, the resolution of the touch display device 100a is inversely proportional to the size of the spacing G between the common electrodes 135, and the spacing G between the common electrodes 135 may be adjusted according to the resolution required by the touch display device 100a. In addition, the touch display device 100a according to this embodiment may also drive both the display structure layer and the touch structure layer T1 according to the time-sharing circuit design.

It should be noted here that the following embodiments follow the element numbers and part of the previous embodiments, where the same numbers are used to indicate the same or similar elements, and the description of the same technical content is omitted. The description of the omitted part may be referred to the preceding embodiments, and will not be repeated in the following embodiments.

Figure 2:
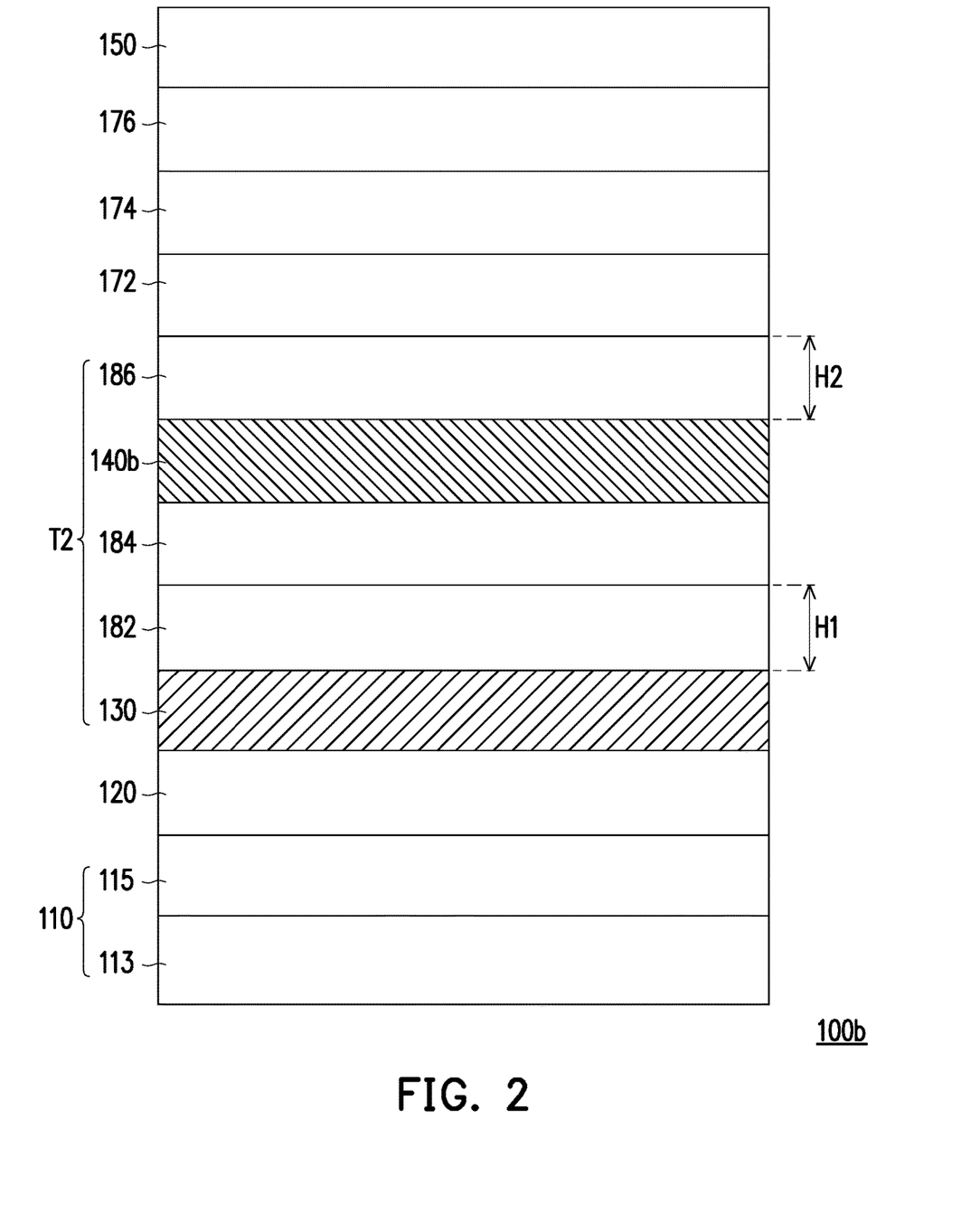
FIG. 2 is a schematic view of a touch display device according to another embodiment of the disclosure.

FIG. 2 is a schematic view of a touch display device according to another embodiment of the disclosure. Referring to FIG. 1A and FIG. 2 at the same time, a touch display device 100b according to this embodiment is similar to the touch display device 100a of FIG. 1A, and the difference between the two is that a touch structure layer T2 according to this embodiment is different from the touch structure layer T1 of FIG. 1A.

In detail, referring to FIG. 2, according to this embodiment, the touch display device 100b further includes a first ultra-thin glass 182, an optical adhesive layer 184, and a second ultra-thin glass 186. The first ultra-thin glass 182 is disposed on the common electrode layer 130, and the optical adhesive layer 184 is disposed on the first ultra-thin glass 182. The second ultra-thin glass 186 is disposed on the optical adhesive layer 184, in which a touch electrode layer 140b is located between the second ultra-thin glass 186 and the optical adhesive layer 184. That is, the first ultra-thin glass 182, the optical adhesive layer 184, the touch electrode layer 140b, and the second ultra-thin glass 186 are sequentially stacked on the common electrode layer 130. Here, the common electrode layer 130, the first ultra-thin glass 182, the optical adhesive layer 184, the touch electrode layer 140b, and the second ultra-thin glass 186 define the touch structure layer T2.

In order to improve the optical properties and avoid air bubbles during the lamination process, according to this embodiment, plastic substrate is replaced by the ultra-thin glass. Preferably, a thickness H1 of the first ultra-thin glass 182 and a thickness H2 of the second ultra-thin glass 186 are both, for example, less than 150 μm, and water permeability of the first ultra-thin glass 182 and water permeability of the second ultra-thin glass 186 are both, for example, less than $10^{-6}$ g/m². Since the water permeability of the first ultra-thin glass 182 and the water permeability of the second ultra-thin glass 186 are both, for example, less than $10^{-6}$ g/m², which is much lower than the barrier layer 162 in FIG. 1A, the barrier layer 162 in FIG. 1A may be omitted. Therefore, the touch display device 100b according to this embodiment may have a thinner thickness, which may improve the optical performance and meet the demand of thinness.

Figure 3:
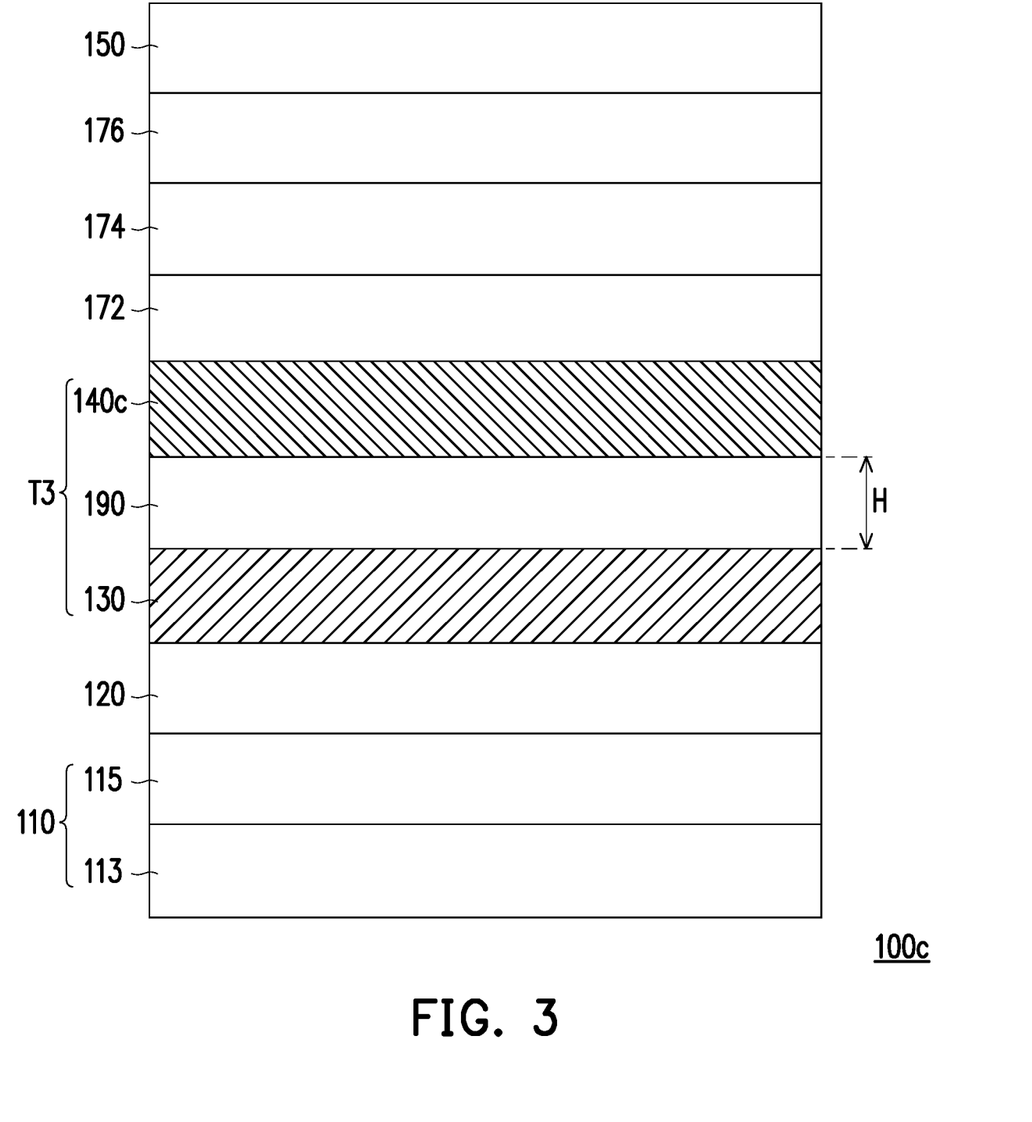
FIG. 3 is a schematic view of a touch display device according to another embodiment of the disclosure.

FIG. 3 is a schematic view of a touch display device according to another embodiment of the disclosure. Referring to FIG. 1A and FIG. 3 at the same time, a touch display device 100c according to this embodiment is similar to the touch display device 100a of FIG. 1A, and the difference between the two is that a touch structure layer T3 according to this embodiment is different from the touch structure layer T1 of FIG. 1A.

In detail, referring to FIG. 3, according to this embodiment, the touch display device 100c further includes an ultra-thin glass 190 disposed on the common electrode layer 130. The ultra-thin glass 190 is located between the common electrode layer 130 and a touch electrode layer 140c. The common electrode layer 130, the ultra-thin glass 190, and the touch electrode layer 140c define the touch structure layer T3. A material of the common electrode layer 130 and the touch electrode layer 140c may be, for example, a metal oxide (e.g., indium tin oxide (ITO)). Here, a thickness H of the ultra-thin glass 190 is, for example, less than 150 μm, and water permeability of the ultra-thin glass 190 is, for example, less than $10^{-6}$ g/m², which may improve the optical properties of the touch display device 100c and avoid air bubbles during the lamination process.

Figure 4:
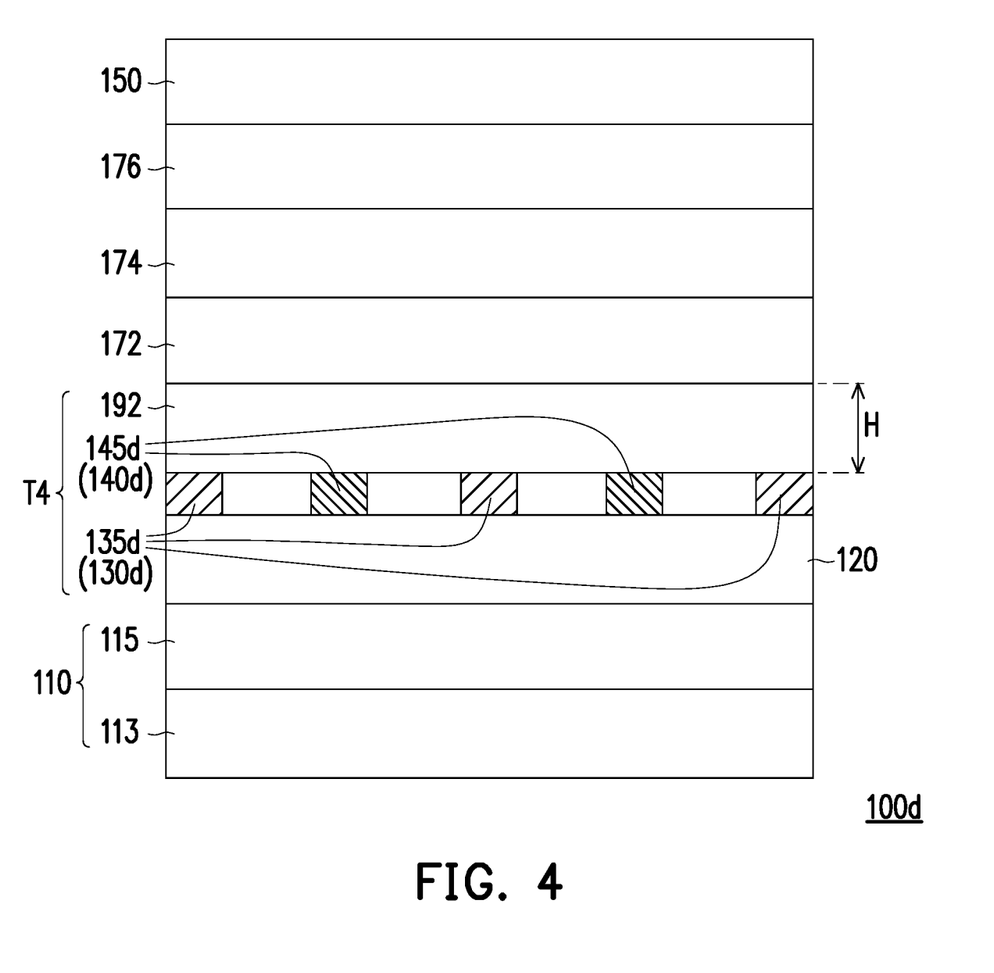
FIG. 4 is a schematic view of a touch display device according to another embodiment of the disclosure.

FIG. 4 is a schematic view of a touch display device according to another embodiment of the disclosure. Referring to FIG. 1A and FIG. 4 at the same time, a touch display device 100d according to this embodiment is similar to the touch display device 100a of FIG. 1A, and the difference between the two is that a touch structure layer T4 according to this embodiment is different from the touch structure layer T1 of FIG. 1A.

In detail, referring to FIG. 4, according to this embodiment, the touch display device 100d further includes an ultra-thin glass 192 disposed on a common electrode layer 130d and a touch electrode layer 140d. Multiple touch electrodes 145d of the touch electrode layer 140d and multiple common electrodes 135d of the common electrode layer 130d are alternately arranged and belong to the same film layer. The common electrode layer 130d, the touch electrode layer 140d, and the ultra-thin glass 192 define the touch structure layer T4. When materials of the common electrode layer 130d and the touch electrode layer 140d are both metal oxides (e.g., indium tin oxide (ITO)), the touch structure layer T4 according to this embodiment may be regarded as a stacked structure design of SITO, i.e., a single layer of ITO is used to sense touch signals, and X and Y axis sensing metal lines are placed on the same layer of ITO, and then laminated with glass substrate or polyester film to form a stacked structure design of touch panel. Here, a thickness H of the ultra-thin glass 192 is, for example, less than 150 μm, and water permeability of the ultra-thin glass 192 is, for example, less than $10^{-6}$ g/m², which may improve the optical properties of the touch display device 100d and avoid air bubbles during the lamination process.

Figure 5:
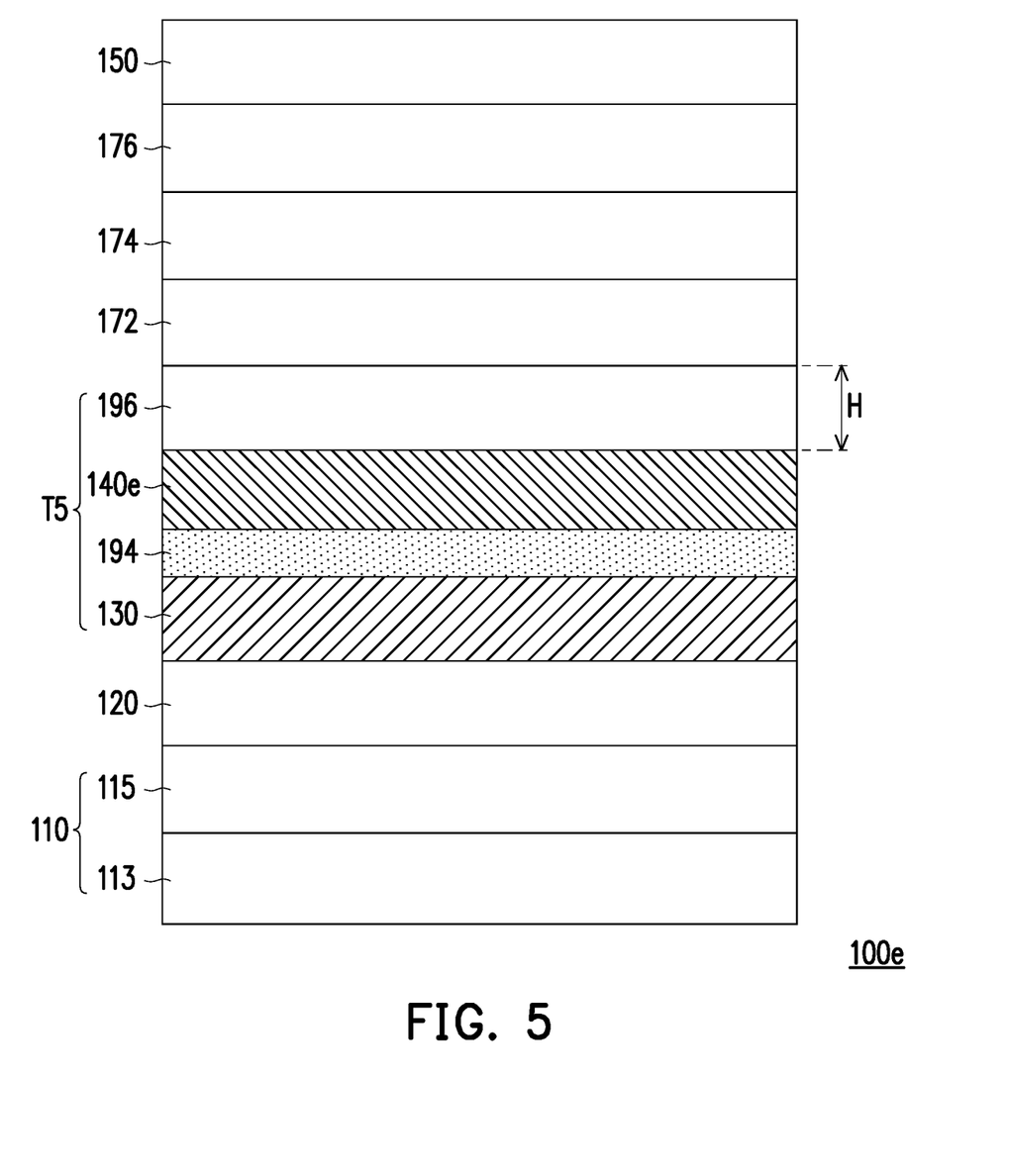
FIG. 5 is a schematic view of a touch display device according to another embodiment of the disclosure.

FIG. 5 is a schematic view of a touch display device according to another embodiment of the disclosure. Referring to FIG. 1A and FIG. 5 at the same time, a touch display device 100e according to this embodiment is similar to the touch display device 100a of FIG. 1A, and the difference between the two is that a touch structure layer T5 according to this embodiment is different from the touch structure layer T1 of FIG. 1A.

In detail, referring to FIG. 5, according to this embodiment, the touch display device 100e further includes an insulating layer 194 and an ultra-thin glass 196. The insulating layer 194 is disposed on the common electrode layer 130, and the ultra-thin glass 196 is disposed on a touch electrode layer 140e, in which the touch electrode layer 140e is located between the ultra-thin glass 196 and the insulating layer 194. That is, the insulating layer 194 is located between the common electrode layer 130 and the touch electrode layer 140e, and the insulating layer 194, the touch electrode layer 140e, and the ultra-thin glass 196 are sequentially stacked on the common electrode layer 130. Here, the common electrode layer 130, the insulating layer 194, the touch electrode layer 140e, and the ultra-thin glass 196 define the touch structure layer T5. That is, the touch structure layer T5 according to this embodiment is specified as a stacked structure design of single-sided double layer touch electrodes.

In the embodiment not shown, the ultra-thin glass (whose thickness is less than 150 μm) may also be replaced by the glass with a thickness less than 400 μm.

To sum up, in the design of the touch display device of the disclosure, the common electrode layer is in direct contact with and disposed on the display medium layer, and the touch electrode layer and the common electrode layer define the touch structure layer, which means that the common electrode layer may be used as both the common electrode and the touch electrode. In this way, the process steps of the touch display device of the disclosure may be effectively reduced the manufacturing cost, and the overall thickness of the touch display device of the disclosure may be effectively reduced to enhance the optical properties and meet the demand of thinness.

It will be apparent to those skilled in the art that various modifications and variations can be made to the disclosed without departing from the scope or spirit of the disclosure. In view of the foregoing, it is intended that the disclosure covers modifications and variations provided that they fall within the scope of the following claims and their equivalents.

What is claimed is:

1. A touch display device comprising:
a driving substrate;
a display medium layer disposed on the driving substrate;
a common electrode layer in direct contact with and disposed on the display medium layer, wherein the common electrode layer comprises a plurality of common electrodes, and the two adjacent common electrodes have a spacing between each other;
a touch electrode layer disposed on the display medium layer, wherein the touch electrode layer and the common electrode layer define a touch structure layer;
a protective layer disposed on the touch electrode layer;
a barrier layer disposed on the common electrode layer;
a first substrate disposed on the barrier layer;
an optical adhesive layer disposed on the first substrate; and
a second substrate disposed on the optical adhesive layer, wherein the touch electrode layer is located between the second substrate and the optical adhesive layer, and the common electrode layer, the barrier layer, the first substrate, the optical adhesive layer, the touch electrode layer, and the second substrate define the touch structure layer.

2. A touch display device comprising:
a driving substrate;
a display medium layer disposed on the driving substrate;
a common electrode layer in direct contact with and disposed on the display medium layer, wherein the common electrode layer comprises a plurality of common electrodes, and the two adjacent common electrodes have a spacing between each other;
a touch electrode layer disposed on the display medium layer, wherein the touch electrode layer and the common electrode layer define a touch structure layer;
a protective layer disposed on the touch electrode layer;
a first ultra-thin glass disposed on the common electrode layer;
an optical adhesive layer disposed on the first ultra-thin glass; and
a second ultra-thin glass disposed on the optical adhesive layer, wherein the touch electrode layer is located between the second ultra-thin glass and the optical adhesive layer, and the common electrode layer, the first ultra-thin glass, the optical adhesive layer, the touch electrode layer, and the second ultra-thin glass define the touch structure layer.

3. The touch display device according to claim 2, wherein a thickness of the first ultra-thin glass and a thickness of the second ultra-thin glass are both less than 150 μm, and water permeability of the first ultra-thin glass and water permeability of the second ultra-thin glass are less than $10^{-6}$ g/m$^2$.

4. A touch display device comprising:
a driving substrate;
a display medium layer disposed on the driving substrate;
a common electrode layer in direct contact with and disposed on the display medium layer, wherein the common electrode layer comprises a plurality of common electrodes, and the two adjacent common electrodes have a spacing between each other;
a touch electrode layer disposed on the display medium layer, wherein the touch electrode layer and the common electrode layer define a touch structure layer;
a protective layer disposed on the touch electrode layer;
an insulating layer disposed on the common electrode layer; and
an ultra-thin glass disposed on the touch electrode layer, wherein the touch electrode layer is located between the ultra-thin glass and the insulating layer, and the common electrode layer, the insulating layer, the touch electrode layer, and the ultra-thin glass define the touch structure layer.

5. The touch display device according to claim 4, wherein a thickness of the ultra-thin glass is less than 150 μm, and water permeability of the ultra-thin glass is less than $10^{-6}$ g/m$^2$.

6. The touch display device according to claim 1 further comprising:
a first optical adhesive layer disposed on the touch structure layer;
a light guide plate disposed on the first optical adhesive layer; and a second optical adhesive layer disposed on the light guide plate, wherein the protective layer is disposed on the second optical adhesive layer.

7. The touch display device according to claim 1, wherein the spacing is less than or equal to 50 μm.

8. The touch display device according to claim 2 further comprising:
- a first optical adhesive layer disposed on the touch structure layer;
- a light guide plate disposed on the first optical adhesive layer; and
- a second optical adhesive layer disposed on the light guide plate, wherein the protective layer is disposed on the second optical adhesive layer.

9. The touch display device according to claim 2, wherein the spacing is less than or equal to 50 μm.

10. The touch display device according to claim 4 further comprising:
- a first optical adhesive layer disposed on the touch structure layer;
- a light guide plate disposed on the first optical adhesive layer; and
- a second optical adhesive layer disposed on the light guide plate, wherein the protective layer is disposed on the second optical adhesive layer.

11. The touch display device according to claim 4, wherein the spacing is less than or equal to 50 μm.

* * * * *